(No Model.)
I. E. & G. W. JOLLY.
Animal Trap.
No. 241,990.    Patented May 24, 1881.
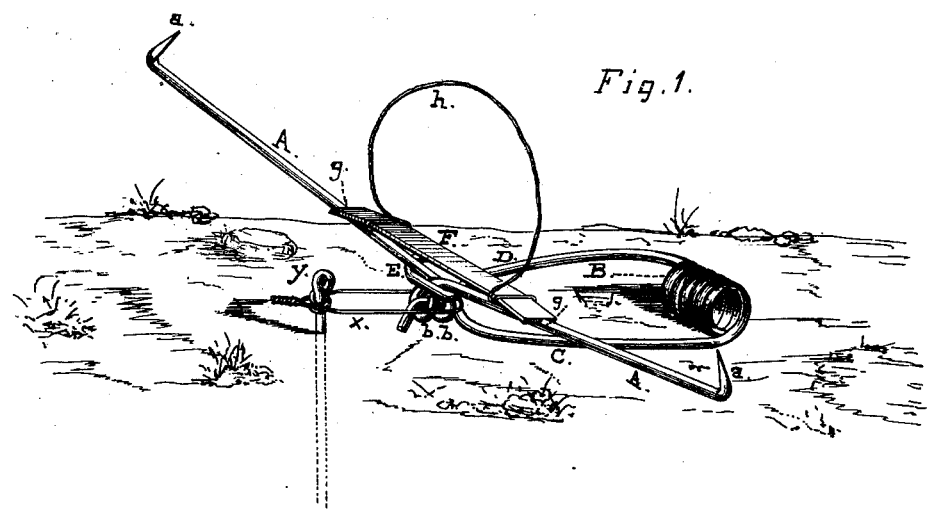
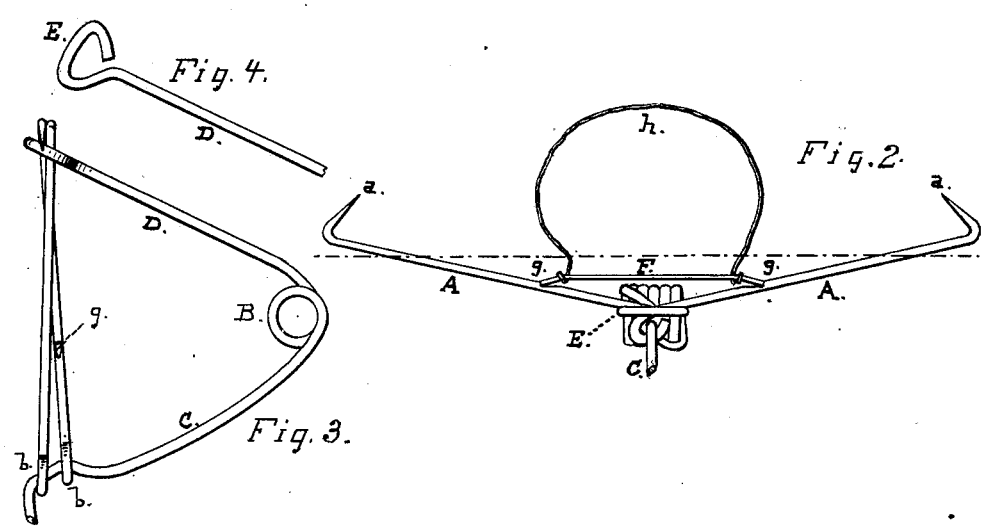
Witnesses:
Inventor:

UNITED STATES PATENT OFFICE.

IDA E. JOLLY AND GEORGE W. JOLLY, OF PARAISO SPRINGS, CALIFORNIA.

ANIMAL-TRAP.

SPECIFICATION forming part of Letters Patent No. 241,990, dated May 24, 1881.

Application filed December 13, 1880. (No model.)

*To all whom it may concern:*

Be it known that we, IDA E. JOLLY and GEORGE W. JOLLY, both of Paraiso Springs, in the county of Monterey and State of California, have made and invented a new and useful Improvement in Animal-Traps; and we do hereby declare that the following is a full, clear, and exact description of the same, reference being had to the accompanying drawings.

Our invention relates to that class of traps in which barbed jaws, hooks, or prongs are operated to close upon and seize the animal when a trigger or releasing device of some kind is touched.

This improved trap is set in the path or run of the animal or in front of its hole, and it is sprung in approaching it either from the front or the rear.

It consists in a novel construction and combination of parts, as hereinafter fully described, whereby we are enabled to provide a simple, inexpensive, durable, and effectual device for catching squirrels and other destructive animals.

In the accompanying drawings referred to, Figure 1 is a perspective view of our trap set for action. Fig. 2 is a front view of Fig. 1. Fig. 3 is a side view of the trap when closed, or sprung. Fig. 4 shows the form of the end of the upper actuating-arm, D.

The arms or parts that seize and hold the animal consist of the two rods A A, having sharp hooks or prongs *a a* formed at the upper ends, and eyes or loops *b b* provided on the other ends, by which we connect and attach the rods to the end of the actuating-spring B. The points or prongs are placed facing each other, and the rods are permanently though loosely fixed to the arm or extension of the spring, so that they can work after the manner of jaws, and can be readily separated at the outer ends and spread apart into a horizontal position. The spring B, by which these rods are actuated, has a central coil and two arms, C D, and we make it from a length of wire of suitable size and elasticity by bending the center of it over and around a mandrel a number of turns to give a coil of the required power, and so as to leave a portion of wire at each end for the arms C D.

To the arm C we attach the two rods A A, in the manner before described, and upon the end of the other arm, D, we form a loop, E, of a size to readily embrace and slide upon the two rods when they are closed together. These two arms are of the same length, and are bent so as to work perpendicularly over each other, and to stand when sprung or released at an angle, or in such position that while the lower arm, C, holds the two rods together at one end the upper arm, D, holds the upper ends of the rods tightly together by means of the loop E around them.

In setting the trap we lay the spring down with its arm C against the ground, and then by pressing down the upper arm, D, we permit the two rods A A to be separated and spread apart horizontally, so that they may lie nearly flat against the ground. At such time the reaction of the spring will throw up the arm D, and close the two rods upon each other if some means is not provided to hold them apart. For this purpose the trigger-plate F is employed.

The two positions of the trap—open and closed—are shown in Figs. 1 and 3 of the drawings.

The trigger-plate F consists of a narrow plate or strip of metal having its ends slightly turned down or beveled in such a way that they will readily engage with and rest in or against notches or equivalent stops *g g*, made in or provided on the inner sides of the rods, or what are their upper sides when they are opened out. When set in this position a slight movement of the plate F is sufficient to disengage it from the notches and spring the trap.

A loop or bow of fine wire, *h*, is fixed to and so as to project upward from the plate F, and lie or extend across the path of the animal in a position to be struck from either end of the trap. This bow *h* is the only part of the trap that is exposed to view, the other parts being covered up with earth or suitable matter to conceal them. It is sufficiently strong to act upon the plate F and throw it out of place, but not of a size to frighten off the animal from his accustomed run.

To prevent the trap from being carried off by the animal when caught, we anchor it by means of the wire *x* and stake *y*, as shown in Fig. 1; but we do not confine ourselves to this particular mode of confining the trap in position.

Having thus fully described our invention, what we claim, and desire to secure by Letters Patent, is—

1. The animal-trap consisting, essentially, of the rods A A, hinged or connected together at their lower ends, b, to open outwardly and be spread apart horizontally, the spring B, having the arm D, upon which is provided the bow or loop E, to embrace and slide up and down on the rods A, and the trigger-plate F, which is arranged to engage with the notches g, as a means for holding the rods A spread apart, all combined and arranged to operate substantially as and for the purpose set forth.

2. The spring B, having the arms or extensions C D, the rods A A, armed with hooks or prongs a a, and attached to the arm C by the eyes b, and the trigger-plate F, for holding the rods A spread apart, substantially as described, all combined as set forth.

In witness whereof we have hereunto set our hands and seals.

IDA E. JOLLY. [L. S.]
   GEO. W. JOLLY. [L. S.]

Witnesses:
 H. MATTHEWS,
 PETER SAVERKRUP.